United States Patent [19]

Crawford et al.

[11] 4,173,489
[45] Nov. 6, 1979

[54] ASPHALT MINERAL AGGREGATE COMPOSITIONS

[75] Inventors: Wheeler C. Crawford, Houston; James R. wilson, Missouri City, both of Tex.

[73] Assignee: Texaco Inc., White Plains, N.Y.

[21] Appl. No.: 895,699

[22] Filed: Apr. 12, 1978

[51] Int. Cl.² ............................................. C08L 95/00
[52] U.S. Cl. ........................... 106/281 N; 106/281 R; 106/287.14
[58] Field of Search .......... 106/281 R, 281 N, 287 SB

[56] References Cited

U.S. PATENT DOCUMENTS

| | | | |
|---|---|---|---|
| 2,570,185 | 4/1947 | Aldrich | 106/281 N |
| 2,760,878 | 8/1956 | Lhorty | 106/283 |
| 3,978,927 | 9/1976 | Kudchadker et al. | 66/274 |
| 4,036,661 | 7/1977 | Schmidt | 106/277 |
| 4,043,396 | 8/1977 | Kudchadker et al. | 166/274 |

Primary Examiner—J. Ziegler
Attorney, Agent, or Firm—Carl G. Ries; Thomas H. Whaley; Walter D. Hunter

[57] ABSTRACT

Surfacing compositions are provided which comprise a mixture of a mineral aggregate, such as particulate slag, asphalt, propoxylated asphalt and, optionally, a silane adhesion promoter.

4 Claims, No Drawings

ASPHALT MINERAL AGGREGATE COMPOSITIONS

BACKGROUND OF THE INVENTION

1. Field of the Invention

This invention relates to asphalt surfacing compositions which are particularly useful in paving construction. The compositions of this invention exhibit improved elasticity and improved adhesion of the asphalt binder to the mineral aggregate. Both the propoxylated asphalt and the silane, if employed, contribute to the improved adhesion properties of these compositions.

2. Description of the Prior Art

A wide variety of compounds have been added to asphalt surfacing compositions in an attempt to improve the adhesion of the asphalt to the mineral aggregate and in attempts to improve the elasticity in such compositions.

A wide variety of silicon compounds including silanes have been used for the impregnation and surface treatment of glass fibers to promote the adhesion of various organic resins such as the polyester resins, epoxide resins or phenol formaldehyde resins and for the surface treatment of textiles, leathers, ceramics and glass materials.

It has been found that the adhesion of asphalt to siliceous aggregates could be markedly improved by first treating the aggregate with vapors of a mixture of methylchlorosilanes. This method, which is rather exotic, is not practical in large scale applications. Sanderson, F. C., "Methylchlorosilanes as Anti-stripping Agents". Proceedings, Highway Research Board, 31,288 (1952).

A great number of patents, particularly those in class 106, subclasses 273 and 277 disclose many compositions and processes for improving the adhesion of asphalt binders to mineral aggregate. The patent literature referring to silicon compound chemistry continually is concerned with the thermal stability of silicon compounds. The most desirable compounds for use as adhesion promoters must promote the adhesion of asphalt to mineral aggregate and remain stable over a wide temperature range and for an extended period. In addition to this it is highly desirable that the adhesion promoters be capable of being used without exotic application methods. Preferably it should be possible to introduce the promoter into the asphalt in the molten state or to apply it to the mineral aggregate prior to mixing with the asphalt or both.

SUMMARY OF THE INVENTION

In brief, the asphalt surfacing compositions of this invention comprise:
(a) a mineral aggregate such as particulate slag,
(b) an asphalt,
(c) a propoxylated asphalt, and optionally,
(d) a silane adhesion promoter.

DETAILED DESCRIPTION OF THE INVENTION

The asphalt surfacing compositions of this invention which exhibit increased elasticity and increased adherence of the asphalt components to the mineral aggregate comprise:
(a) 100 parts by weight of a mineral aggregate,
(b) from 3 to 15 parts by weight of an asphalt,
(c) from 1 to about 10 parts by weight of a propoxylated asphalt, and, optionally,
(d) from 0.0001 to about 0.12 parts by weight of a silane adhesion promoter.

Although particular mineral aggregates employed to form the bituminous surfacing compositions of this invention are not critical, an especially useful mineral aggregate is particulate slag, such as basic-oxygen-furnace slag. Other common aggregates such as crushed limestone, crushed limestone, crushed rock, sand, gravel, etc. may be employed in preparing the bituminous surfacing compositions of this invention.

The general process of preparing the asphalt mineral aggregate compositions of this invention involves the mixing of the molten asphalt, molten propoxylated asphalt, and the aggregate which may also be heated, if desired. The silane may be added to the molten asphalt materials prior to the addition of the aggregate, if desired.

Many types of asphalts are useful in preparing the propoxylated asphalts and the surfacing compositions of this invention. The American Society for Testing and Materials defines asphalts as "A dark brown to black cementitious material, solid or semi-solid in consistency, in which the predominating constituents are bitumens which occur in nature as such or are obtained as residua in refining petroleum." Thus, asphalts occur naturally or may be obtained as residues in petroleum refining. The Kirk-Othmer Encyclopedia of Chemical Technology, Volume 2 at pages 762 to 789 discusses the general characteristics of various types of asphalts.

Petroleum derived asphalts may be further divided into straight reduced asphalts which are obtained in reduced pressure stills or precipitated with propane or butane. Also, asphalts may be obtained from the residues of cracking operations. Petroleum derived asphalts may also be of air blow variety.

Naturally occurring asphalts include gilsonite graphamite, glance pitch, Burmudez, rock asphalts and Trinidad.

Many other examples of both petroleum derived and natural asphalts could be given but the above description will apprise those skilled in the art of asphalt stocks acceptable for use in this invention.

The preparation of the propoxylated asphalts is described in U.S. Pat. No. 4,043,396 which is incorporated herein by reference in its entirety. Any of the asphalt materials previously described may be alkoxylated by the method set out in U.S. Pat. No. 4,043,396.

In preparing the propoxylated asphalts propylene oxide or a mixture of ethylene oxide and propylene oxide wherein the weight percent of propylene oxide is about 70 to about 95 are utilized as alkoxylating agents. Useful alkoxylated asphalts include asphalts propoxylated with from about 2 to about 100 weight percent of the above described agents. In preparing such alkoxylated products the required quantity of asphalt, a minor amount of a powdered alkali metal hydroxides and a solvent sufficient to dissolve the asphalt such as toluene, xylene, etc. are charged to an autoclave. The autoclave temperature is raised to about 100° C. to about 200° C. and the required amount of the alkoxylating agent is pressured with nitrogen into the autoclave. Usually the alkylene oxide is added in several incremental amounts. After all the alkoxylating agent has been added, the autoclave and contents are generally maintained at the reaction temperature for about 1 hour after which the reactor is cooled and then purged with nitrogen. Evaporation of the solvents and stripping of the reaction mixture yields the propoxylated asphalt product which is a dark, viscous liquid.

A wide variety of silane type adhesion promoter may be employed in preparing the bituminous emulsions of this invention such as aminoalkoxy silanes as exemplified by di-t-butoxy-diaminosilane, methylhalosilanes, etc. An especially useful class of silane adhesion promoters includes compounds set out in U.S. Pat. No. 4,038,096 which have the formula:

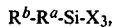

wherein (a) X represents halogen, e.g. fluorine, chlorine, bromine and the like, preferably chlorine, or alkoxy containing 1 to 4 carbon atoms, e.g. methoxy, ethoxy, propoxy, isopropoxy, butoxy, isobutoxy, sec-butoxy, tert-butoxy;

(b) $R^a$ represents alkylene preferably containing 2 to 4 carbon atoms, e.g., ethylene, trimethylene, methylethylene, alpha-methyl trimethylene, betamethyl trimethylene, tetramethylene, and the like;

(c) $R^b$ respresents amino; aminoalkylene amino, preferably containing 1 to 3 carbon atoms, e.g. amino methylene amino, aminoethylene amino, aminotrimethylene amino, aminoethylethylene amino; gammaglycidoxy; hydrocarboxyl, preferably containing from 12 to 19 carbon atoms, e.g. dodecyl, tridecyl, tetradecyl, pentadecyl, hexadecyl, heptadecyl, actadecyl, nonadecyl, and the like; acyloxy, preferably containing 2 to 4 carbon atoms, e.g. ethanoyloxy, propanoloxy, butanoyloxy, 2-butenoyloxy, propanoyloxy, butanoyloxy, 2-butenoyloxy, methacryloxy, and the like; or mercapto.

The purpose of adding silanes as the art is well aware, is to prevent the stripping of the bitumen from the aggregate under water immersion.

As previously pointed out, the amount of the silane adhesion promoter in the surfacing compositions of this invention will range from about 0.001 parts to about 0.10 parts by weight per 100 parts by weight of the mineral aggregate. These silanes can be introduced into the bituminous surfacing compositions in a variety of ways such as by being added to the molten asphalt components prior to the mixing with the aggregate.

The silane adhesion promoter, when used, is present in the surfacing compositions in amounts ranging from about 0.0001 to 0.10 parts by weight and, preferably, from about 0.001 to about 0.05 parts by weight per 100 parts by weight of the mineral aggregate.

In another method the aggregate such as the particulate slag, can be treated or coated with the silane which can then be added with mixing to the molten asphalt components. Coating of the aggregate is accomplished by dissolving the silane in a suitable solvent which can be, for example, water, benzene, toluene, xylene, hexane, etc. The solution of the silane which can be heated, if desired, is then sprayed or otherwise dispersed onto the mass of the aggregate. Evaporation of the solvent yields the aggregate coated with the silane. The aggregate, such as the particulate slag, can be advantageously treated with the silane in a fluidized bed operation in which, for example, a solution of the silane of about 0.01 to about 1 weight percent or more in any of the previously mentioned solvents is introduced via a suitable nozzle onto a bed of, for example, particulate slag maintained in a fluidized state with nitrogen, or any other suitable fluidizing gas at a temperature of about 100 to about 180° F.

The preparation of the aggregate treated or coated with the silane adhesion promoter is illustrated in the following example.

Preparation of Silane-Coated Aggregate

A 2000 g amount of particulate slag is maintained in a fluidized state in the upper chamber of a cylindrical vessel having an upper chamber and a lower chamber divided by a horizontally situated gas-pervious partition. Nitrogen, which is the fluidizing gas, at a temperature of 150° F. is introduced into the lower chamber under pressure and passes upwardly through the gas-pervious partition thus forming the fluidized bed of the particulate slag. The vessel is also equipped with a spray head located about 6 inches above the top of the fluidized bed which is connected by tubing to a silane solution tank located outside the cylindrical vessel. Through the spray head there is introduced at the rate of 800 cc. per hour onto the fluidized bed a total of 0.1 g of aminoethyleneaminopropyl trimethoxy silane as a 0.02 weight percent solution of the silane in toluene. The residual concentration of silane on the particulate slag is about 0.001 weight percent.

The following example illustrates the preparation of the surfacing compositions of this invention and is to be considered not limitative.

EXAMPLE I

A surfacing composition is prepared by mixing at a temperature of 325° F. 100 g. of molten steam refined asphalt, 65 g of molten asphalt alkoxylated with 26 weight percent of propylene oxide prepared in the manner previously described by propoxylating an asphalt derived from a lubricating oil deasphalting operation having a melting point of 215°–300° F. which is air blown at 500° F. prior to alkoxylation resulting in a hydroxyl number of 35, and 1000 parts by weight of particulate slag aggregate having a residual concentration of aminoethyleneaminopropyl trimethoxy silane of about 0.001 weight percent prepared in a fluidized bed process. Portions of the surfacing composition are tested under various water immersion conditions and found to exhibit excellent resistance to stripping while immersed in water at elevated temperatures.

What is claimed is:

1. A surfacing composition comprising:
   (a) 100 parts by weight of a mineral aggregate,
   (b) about 3 to about 15 parts by weight of an asphalt,
   (c) about 1 to about 10 parts by weight of a propoxylated asphalt and wherein the said aggregate is coated with a silane adhesion promoter in an amount such that a residual concentration of the said silane on the aggregate is about 0.001 to about 0.01 weight percent.

2. The composition of claim 1 wherein the said mineral aggregate is particulate slag.

3. The composition of claim 1 wherein the said propoxylated asphalt is an asphalt propoxylated with about 2 to about 100 weight percent of propylene oxide.

4. The surfacing composition of claim 1 wherein the said silane is selected from the group consisting of β-aminoethyl-γ-aminopropyl trimethoxysilane and γ-aminopropyl triethoxysilane.

* * * * *